(12) United States Patent
Shiitani et al.

(10) Patent No.: US 6,215,912 B1
(45) Date of Patent: *Apr. 10, 2001

(54) IMAGE PROCESSING APPARATUS AND RECORDING MEDIUM

(75) Inventors: Shuichi Shiitani; Masaki Watanabe, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/955,529

(22) Filed: Oct. 22, 1997

(30) Foreign Application Priority Data

Mar. 19, 1997 (JP) .................................................. 9-067009

(51) Int. Cl.$^7$ ...................................................... G06K 9/40
(52) U.S. Cl. ............................................ 382/274; 358/531
(58) Field of Search ..................................... 382/293, 274, 382/254; 358/531, 537

(56) References Cited

U.S. PATENT DOCUMENTS

| | | | |
|---|---|---|---|
| 4,476,487 | * 10/1984 | Klie et al. | 358/537 |
| 4,516,155 | * 5/1985 | Hennig et al. | 358/531 |
| 4,829,370 | * 5/1989 | Mayne et al. | 358/531 |
| 4,956,872 | * 9/1990 | Kimura | 382/44 |
| 5,131,056 | * 7/1992 | Willcocks | 382/167 |
| 5,276,510 | * 1/1994 | Cok et al. | 358/500 |
| 5,412,767 | * 5/1995 | Long | 395/133 |
| 5,572,607 | * 11/1996 | Behrends | 382/274 |

* cited by examiner

Primary Examiner—Von J. Couso
(74) Attorney, Agent, or Firm—Staas & Halsey LLP (57) ABSTRACT

An image processing apparatus for retouching a digital image by replacing a pixel value in a retouching range by a pixel value of a partial image at an initial position of a cursor, for example, by moving the cursor, and drawing the partial image at the cursor portion repeatedly in other parts.

20 Claims, 10 Drawing Sheets

IMAGE PROCESSING APPARATUS AND RECORDING MEDIUM

BACKGROUND OF THE INVENTION

The present invention relates to an image processing apparatus for retouching a digital image by drawing the image at, for example, the cursor part of the digital image on a screen repeatedly in other parts, and a recording medium in which a computer program for image processing is recorded.

Along with the wide spreading of a digital camera, scanner, multimedia system, etc., general users come to have more opportunities of taking an image into a computer. Accordingly, as a tool for supporting the retouching of image taken into the computer, various products of software are presented for retouching the taken digital image.

Such software includes as retouching methods for erasing unnecessary objects, located in front of a building, such as passers-by and trees, and leaving the background building, a method of magnifying the partial image containing the unnecessary objects, and retouching and erasing this part dot by dot, on considering the surrounding intensity and color, and a method of cutting out a part of a building wall, sky or the like in a proper range, pasting the partial image to a part of unnecessary object, and erasing.

An image of a wall or the like, meanwhile, which appears to be entirely uniform in intensity in a photographic image is actually composed of pixels of different colors and intensity delicately changing depending on the texture, ray of light, etc. Therefore, even in the case of retouch of dot by dot for erasing a part of the wall which appears to be uniform, a sophisticated skill is required for retouching into a natural image on considering the surrounding intensity and colors.

Incidentally, a method of pasting another portion by utilizing the function called "copy and paste" is easy, but a photographic image as mentioned above is composed of pixels of different colors and intensity despite appearing to be uniform entirely, and therefore the boundary of the pasted portion and the surrounding is obvious, and an unnatural image with a strange feel is produced. It hence requires correction processing for making the boundary line vague to melt the pasted portion into the surrounding, making the retouching operation complicated.

SUMMARY OF THE INVENTION

The present invention is directed to solve the problems discussed above, and is to provide an image processing apparatus for retouching an image without requiring a special skill.

According to the present invention, an image portion and a range in which the retouching is expected is designated as by dragging a mouse, the retouching portion is positioned from the designated image portion and range, the color and/or color intensity of each pixel forming the designated image portion are detected, the detected color and/or color intensity are stored in a memory, data required for retouching is generated by reading the stored color and/or color intensity, and the image portion within the designated range is retouched in accordance with the generated data.

The above and further objects and features of the invention will more fully be apparent from the following detailed description with the accompanying drawings.

DETAILED DESCRIPTION OF THE INVENTION

Figure 1:
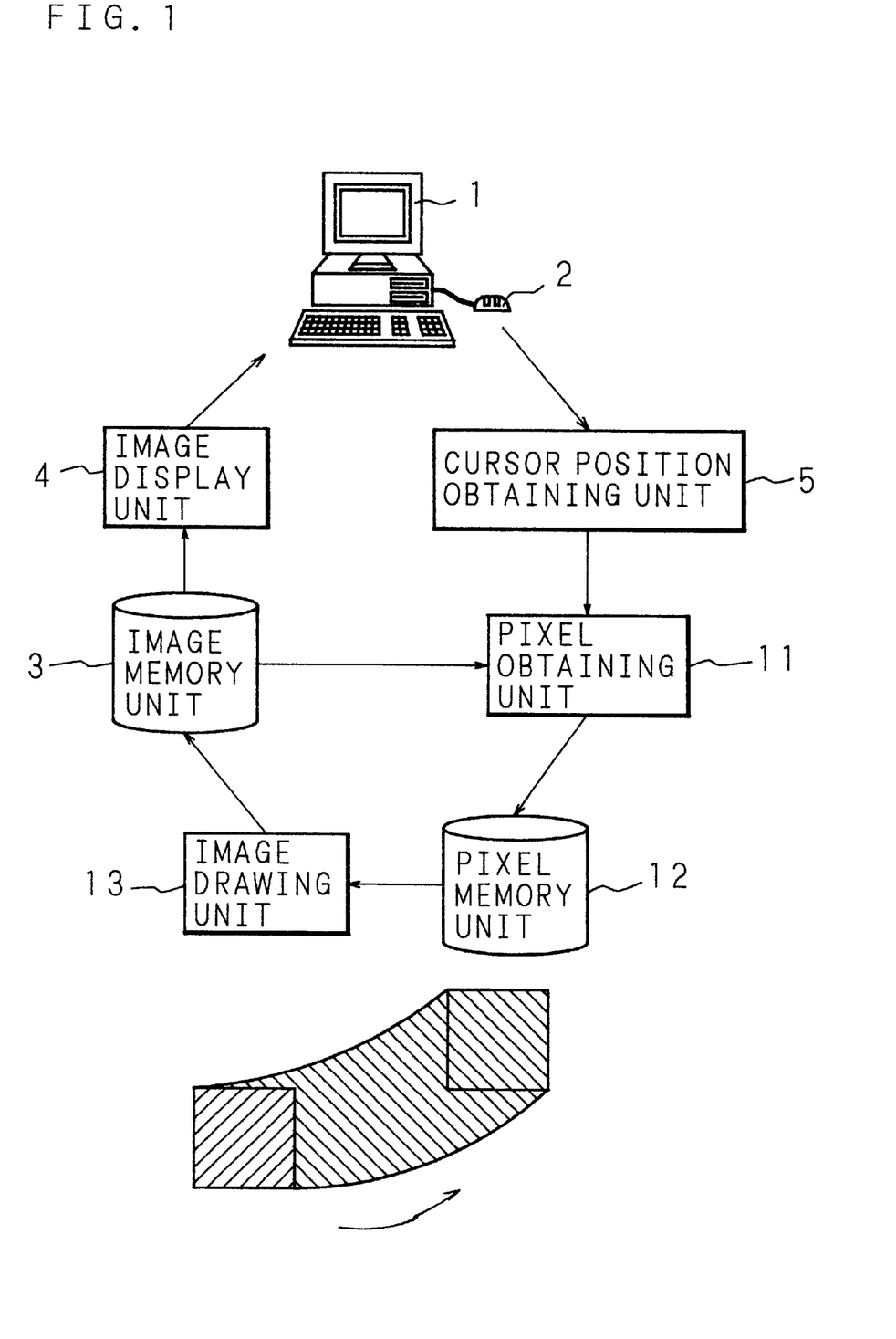
FIG. 1 is a diagram showing the principle of the invention.

FIG. 1 is a diagram showing the principle of the invention.

In the diagram, reference numeral 1 is a screen for displaying an the image, cursor and others, and a cursor of, for example, square shape moves on the screen 1 depending on the motion of a mouse 2. By clicking of the mouse 2, an image corresponding to, for example, a square shape at the cursor position is designated as a partial image to be used in image retouching, and a retouching range is designated, for example, by dragging of the mouse 2.

An image memory unit 3 stores pixel values of color and tone level (brightness, etc.) of each pixel, corresponding to the position data of each pixel which composes an image.

An image display unit 4 reads out the pixel value of each pixel from the image memory unit 3 at a specific period, and displays the image corresponding to the position data of each pixel and its pixel value stored in the image memory unit 3 on the screen 1.

A cursor position acquisition unit 5 detects the cursor position on the basis of the moving direction and moving distance of the mouse 2, and obtains a partial image to be used in image retouching and a range for retouching according to the coordinate data of the detected position on the screen 1.

A pixel obtaining unit 11 reads out the pixel value corresponding to the coordinate data of the cursor position obtained from the cursor position obtaining unit 5 from the image memory unit 3, to store the pixel value in a pixel memory unit 12. An image drawing unit 13 replaces the pixel value in the image memory unit 3 of the pixel at the moving destination of the cursor by dragging of the mouse 2, that is, in the retouching range, with the pixel value at the corresponding position stored in the pixel memory unit 12.

In the invention, the pixel value in the retouching range is replaced by the pixel value of the partial image at the initial position of the cursor (hatching area) along with the move of the cursor as indicated by an arrow in the lower part of FIG. 1. When the image display unit 4 reads out the pixel value from the image memory unit 3 in a specific period, and draws an image on the screen 1, the image in the retouching range is being retouched.

Therefore, extraction of the color to be retouched and drawing of the image can be done easily by continuous operation, for example, clicking and dragging of the mouse.

Also in the invention, by detecting the retouching direction in the retouching range, the pixel value of each stored pixel is controlled by the specified number of rows along the detected direction, and retouching data of each pixel in the direction in the retouching range is created from the pixel values of the pixels in the corresponding row.

Therefore, when desired to leave the image having directivity such as an electric wire and shadow located before the object to be erased, after designating the partial image by including the electric wire or shadow without the object, for example, the retouching data in the range to be retouched by the pixel values of the pixels controlled by row along the retouching direction in the retouching range is created when the cursor is moved in the direction along the electric wire or shadow, so that only the surrounding leaving the electric wire or shadow is erased.

Further in the invention, by detecting the repetition pattern included in the partial image, retouching data is created to reproduce the detected repetition pattern in the retouching range.

Therefore, the repetition pattern is easily reproduced.

In the invention, moreover, by detecting the gradation of color and tone of the partial image, retouching data is created to reproduce the detected gradation in the retouching range.

Therefore, delicate changes of color and brightness can be reproduced.

The invention also creates retouching data by using the pixel values of the pixels selected at random from the group of pixels as the object of creation of retouching data.

Therefore, eliminating the unnatural feel occurring when the partial image consisting of pixels of the same arrangement is drawn repeatedly, a natural image is produced.

Figure 2:
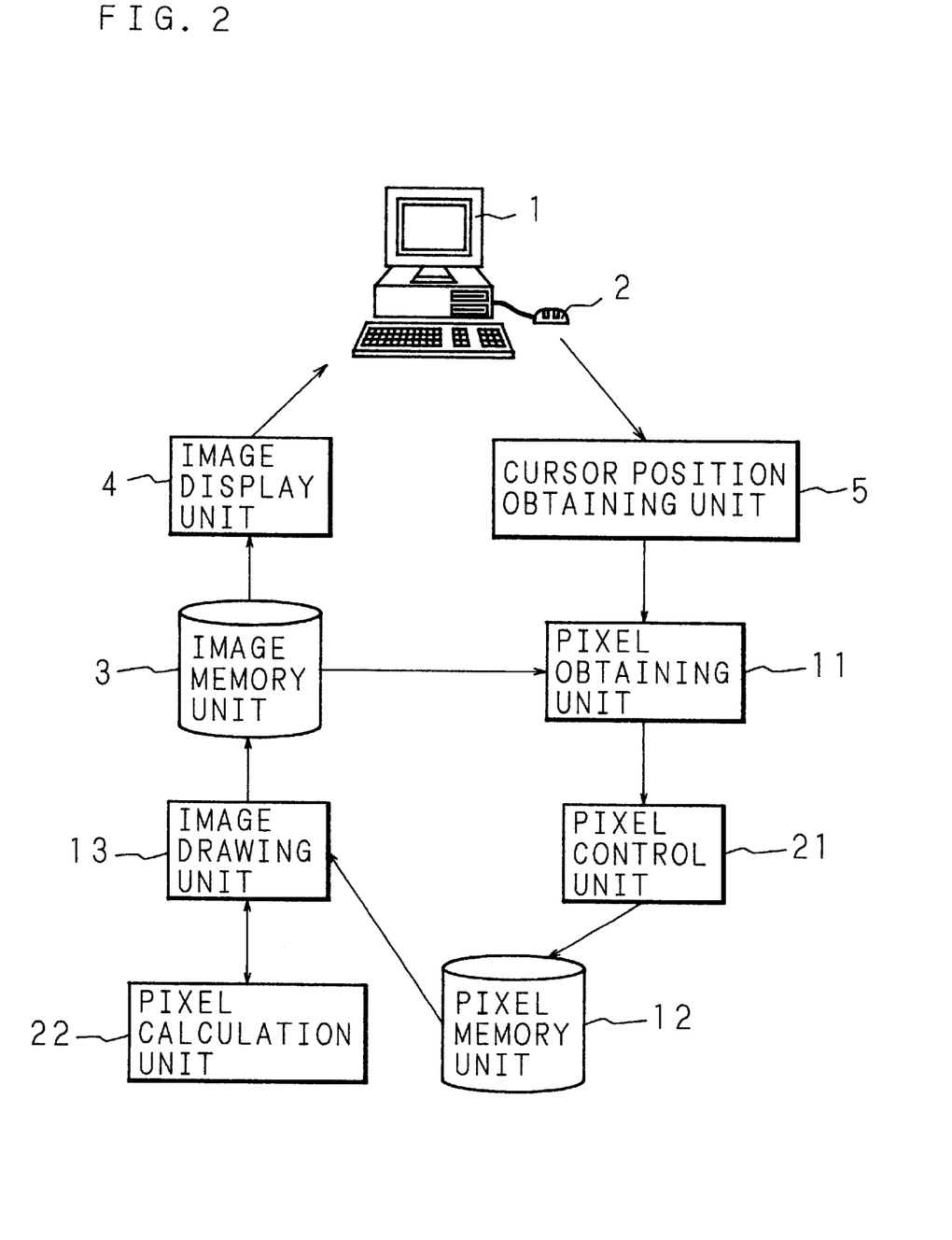
FIG. 2 is a block diagram of embodiment 1 of an image processing apparatus of the invention.

FIG. 2 is a block diagram of embodiment 1 of the image processing apparatus of the invention.

Same parts as in the principle diagram in FIG. 1 are identified with same reference numerals, and their description is omitted.

In embodiment 1, a cursor position obtaining unit 5 is provided with means for detecting the initial moving direction of cursor, and the detected moving direction is given to a pixel control unit 21 through a pixel obtaining unit 11.

The pixel control unit 21 controls the pixel values stored in the pixel memory unit 12, or the pixels obtained by the pixel obtaining unit 11, by row along the initial moving direction of the cursor. The row may be either a row of one pixel or a row of two or more pixels.

A pixel calculation unit 22 draws the pixel to be drawn next, by the pixel value selected at random from the pixel value row on the extension of that pixel.

Figure 3:
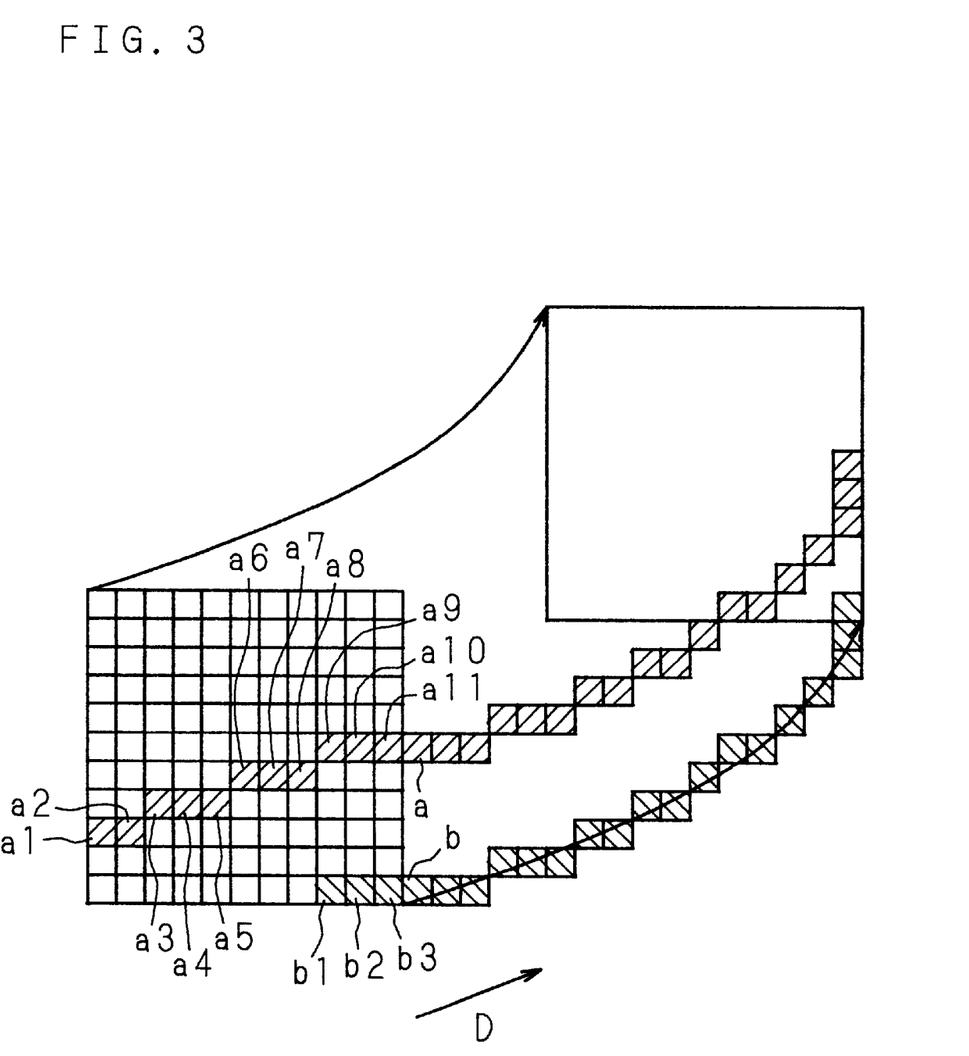
FIG. 3 is a conceptual diagram of an image retouching method in the image processing apparatus of embodiment 1.

FIG. 3 is a conceptual diagram of the image retouching method in the image processing apparatus of embodiment 1.

Detecting the direction D from the initial moving direction of the cursor, the pixel value at the initial position of the cursor is controlled along the direction D, by dividing into rows of one pixel in this example.

For example, when the cursor starts to move in the moving direction D, pixel a located in the extension direction of the pixel row of pixels a1 to a11 is drawn by the pixel value randomly extracted from this pixel row of pixels a1 to a11 arranged along the moving direction D. Random extraction pixel value of the next pixel from the pixel value row is to reflect the error distribution of the original image also in the drawing part, and it is intended to eliminate the unnatural feel caused by repeated drawing by the same pixel value.

Similarly, by the pixel value extracted randomly from the pixel row of pixels b1 to b3 arranged along the moving direction D, pixel b located in the extension direction of this pixel row is drawn.

As a result, for example, if the pixel row of pixels a1 to a11 is a pixel row of an electric wire, by moving the cursor along the direction of the electric wire, the pixel value in the initial position of the cursor is drawn repeatedly, so that the image of the electric wire is left over if the surrounding of the electric wire is altered.

Figure 4:
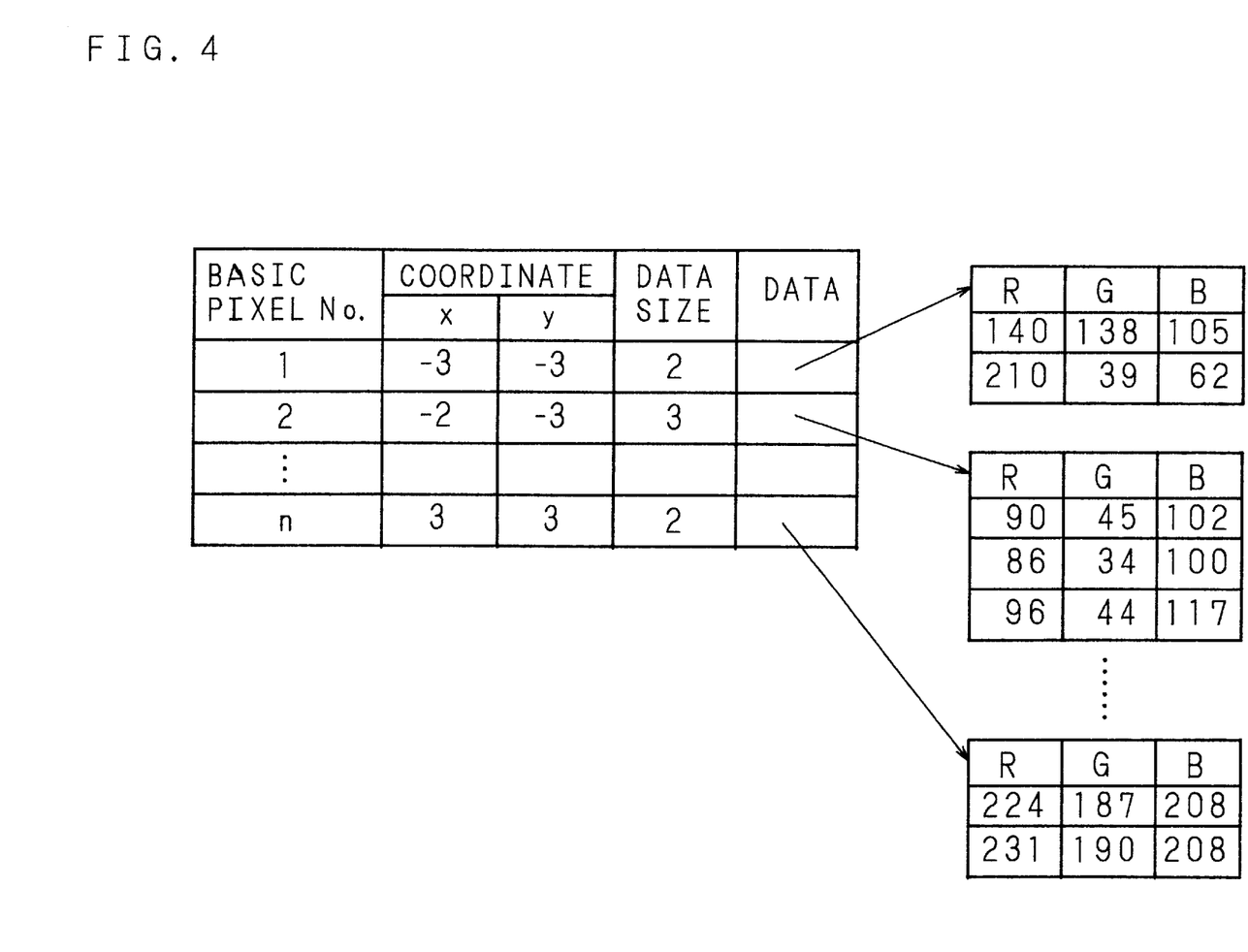
FIG. 4 is a conceptual diagram of the stored state of pixel values in embodiment 1.

FIG. 4 is a conceptual diagram of an example of the stored state of pixel values in the image processing apparatus of embodiment 1.

A basic pixel number is attached to each pixel group continuous in the horizontal direction in each pixel value row along the moving direction D of the cursor, and the number of pixels (size of data) contained in each pixel group and the intensity data of R, G, B of each pixel are stored, corresponding to the xy coordinate data of the pixel at the left end, for example, of the pixel group of the basic pixel number.

Figure 5:
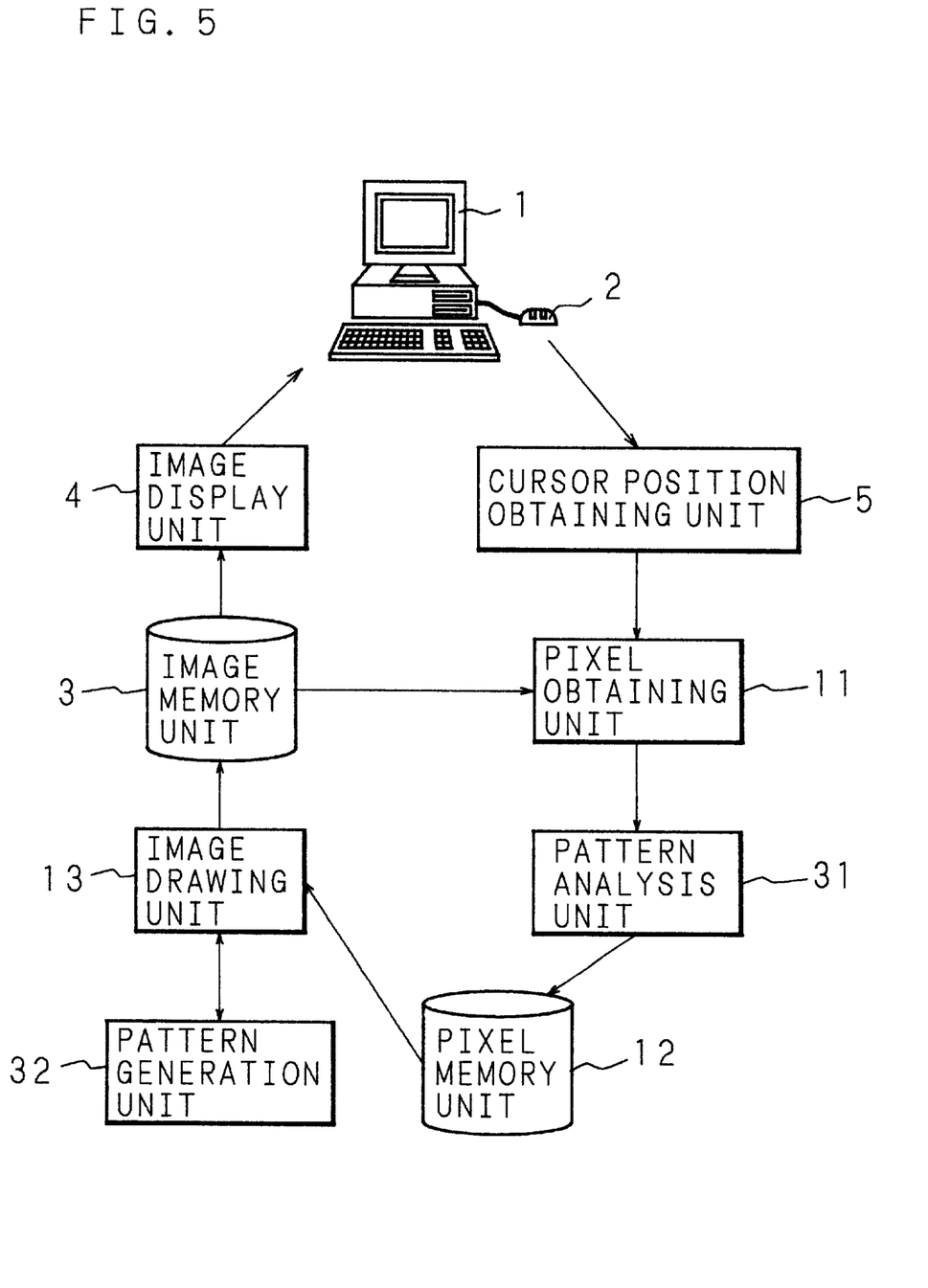
FIG. 5 is a block diagram of embodiment 2 of an image processing apparatus of the invention.

FIG. 5 is a block diagram of embodiment 2 of the image processing apparatus of the invention.

Same parts as in the principle diagram in FIG. 1 are identified with same reference numerals, and their description is omitted.

In embodiment 2, a cursor position obtaining unit 5 is provided with means for detecting the initial moving direction of the cursor, and the detected moving direction is given to a pattern analysis unit 31 through a pixel obtaining unit 11.

The pattern analysis unit 31 analyzes the pixel value obtained by the pixel obtaining unit 11, and obtains the repetition pattern repeated, for example, in the initial moving direction of the cursor. A pattern generation unit 32 generates retouching data for reproducing the repetition pattern in the retouching range.

Figure 6:
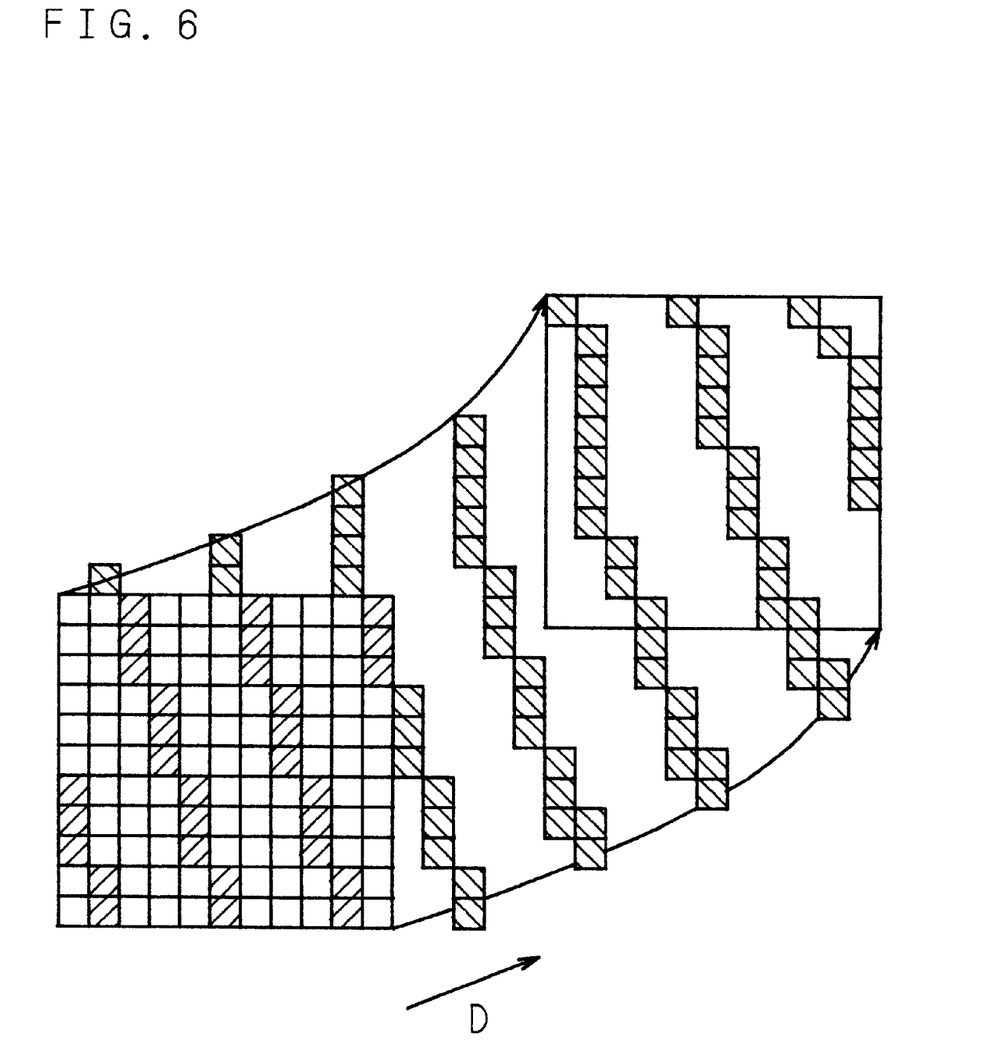
FIG. 6 is a conceptual diagram of an image retouching method in the image processing apparatus of embodiment 2.

FIG. 6 is a conceptual diagram of the image retouching method in the image processing apparatus of embodiment 2.

Detecting every what pixel the same pattern is repeated in the moving direction D of the cursor, the amplitude and pattern are stored in the pixel memory unit 12.

The pattern stored in the pixel memory unit 12 along the moving direction D of the cursor is drawn by repeating at this amplitude.

Figure 7:
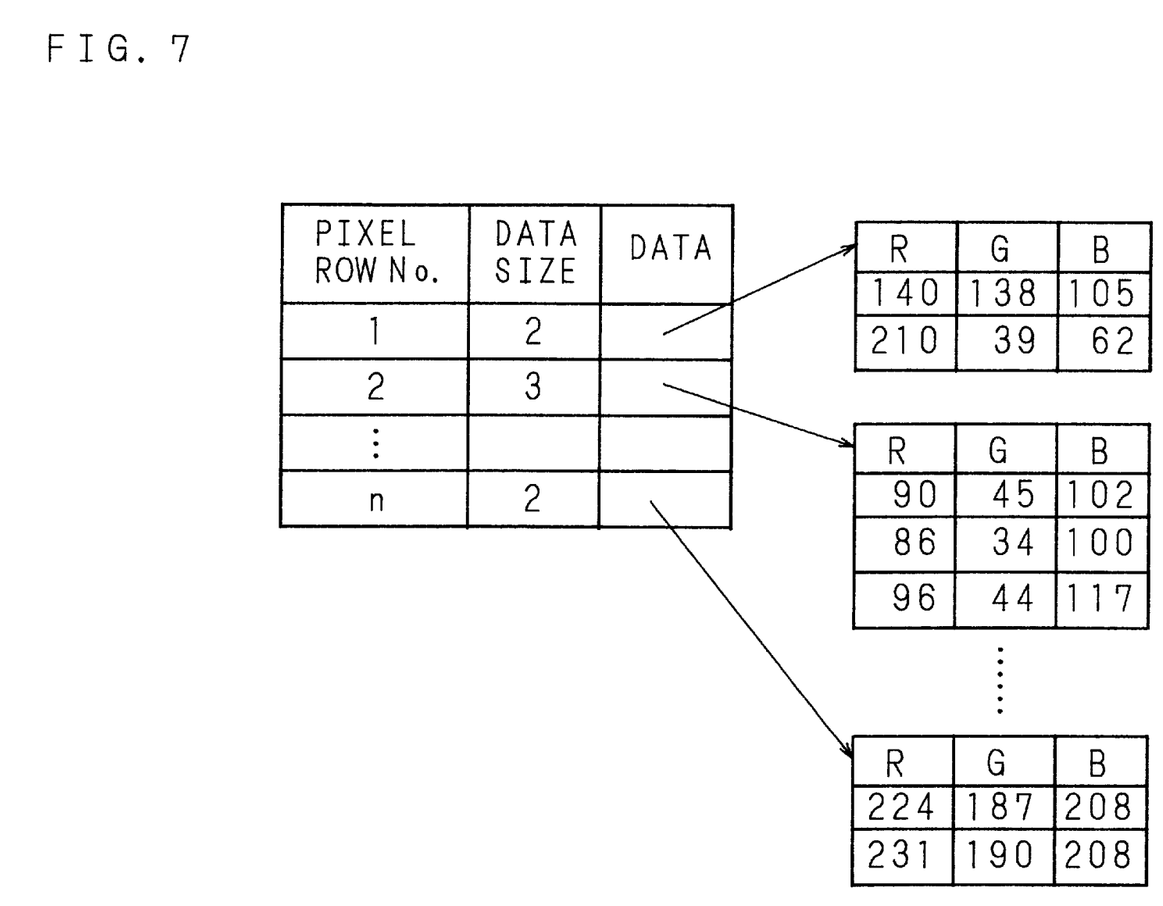
FIG. 7 is a conceptual diagram of the stored state of pixel values in embodiment 2.

FIG. 7 is a conceptual diagram of the stored state of pixel values in embodiment 2.

A pixel row number is attached to each pixel group continuous in the horizontal direction in each pixel row along the moving direction D of the cursor, and the number of pixels (size of data) contained in the pixel group of each pixel row number, and the intensity data of R, G, B of each pixel are stored.

Figure 8:
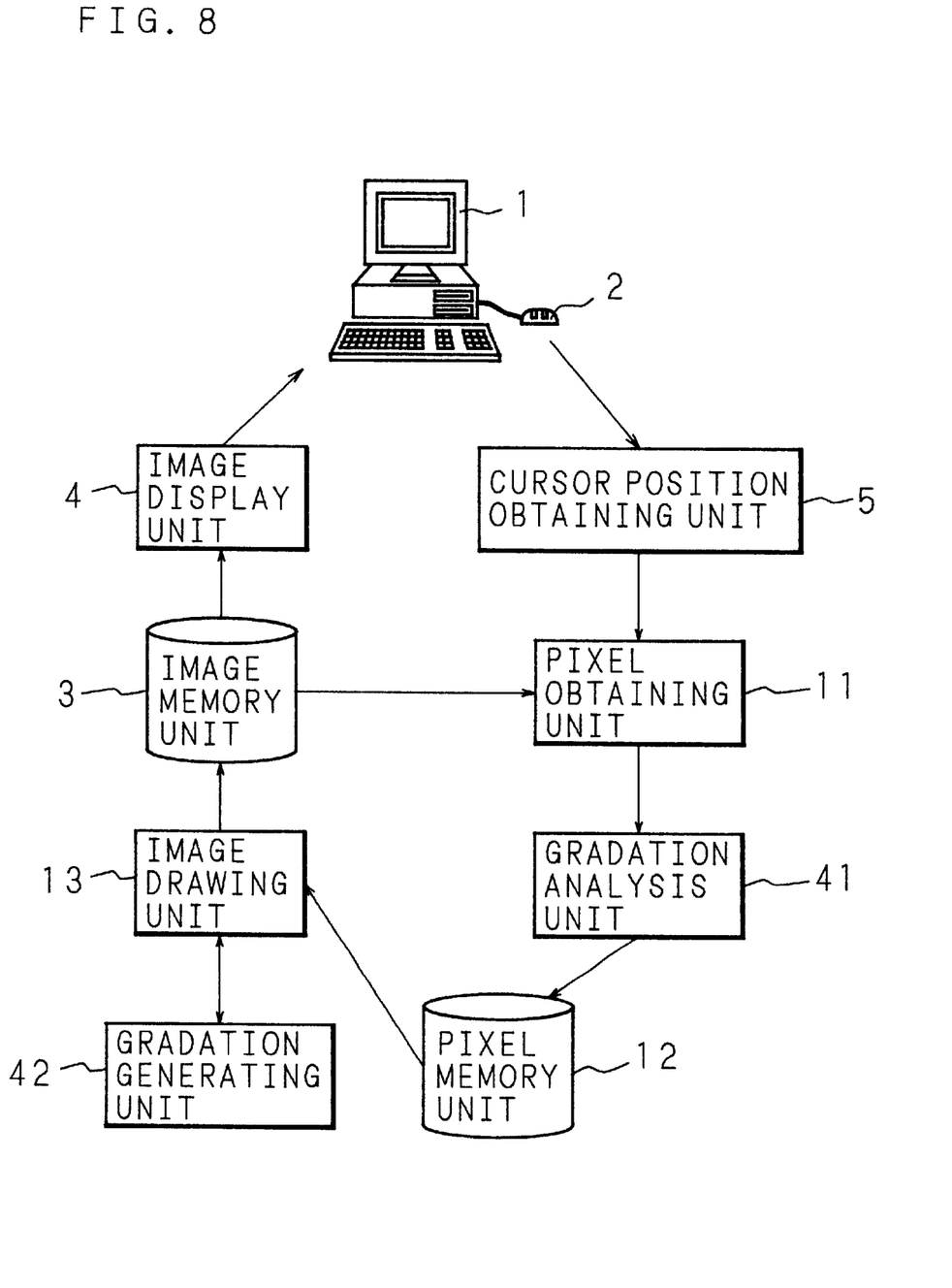
FIG. 8 is a block diagram of embodiment 3 of an image processing apparatus of the invention.

FIG. 8 is a block diagram of embodiment 3 of the image processing apparatus of the invention.

Same parts as in the principle diagram in FIG. 1 are identified with same reference numerals, and their description is omitted.

In embodiment 3, a cursor position obtaining unit 5 is provided with means for detecting the initial moving direction of the cursor, and the detected moving direction is given to a gradation analysis unit 41 through a pixel obtained unit 11.

The gradation analysis unit 41 analyzes the pixel value obtained by the pixel obtaining unit 11, and obtains the gradation changing in, for example, the initial moving direction of the cursor. A gradation generating unit 42 generates retouching data to reproduce gradation in the retouching range.

Figure 9:
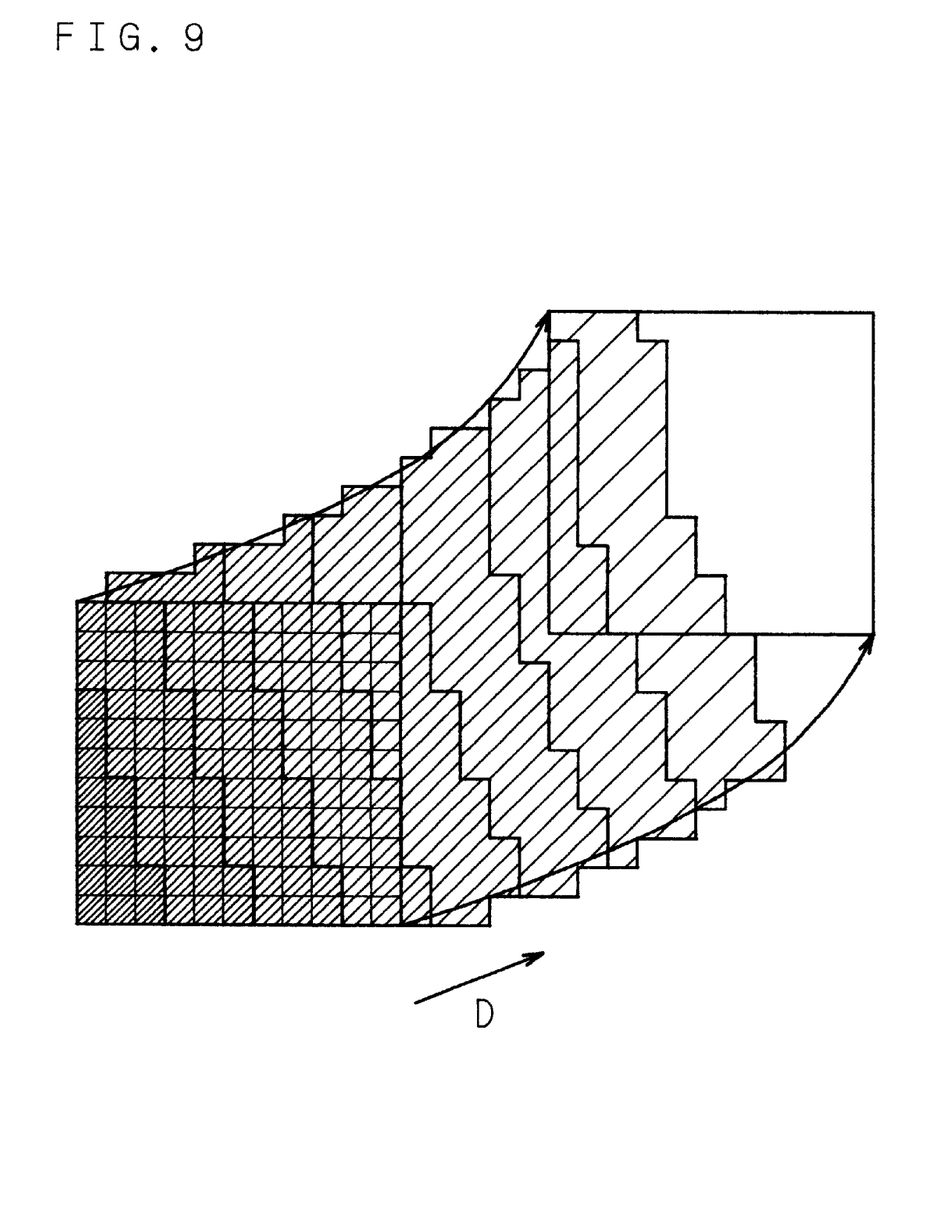
FIG. 9 is a conceptual diagram of an image retouching method in the image processing apparatus of embodiment 3.

FIG. 9 is a conceptual diagram of the image retouching method in the image processing apparatus of embodiment 3.

Detecting whether the intensities of the pixels in the cursor moving direction D is changing regularly or not, such regulation is stored in the pixel memory unit 12.

The picture is drawn by the pixel values along the cursor moving direction D conforming to the regulation stored in the pixel memory unit 12.

These various retouching modes can be also designated by the user prior to retouching, or may be selected automatically by the computer according to the specified priority order.

Figure 10:
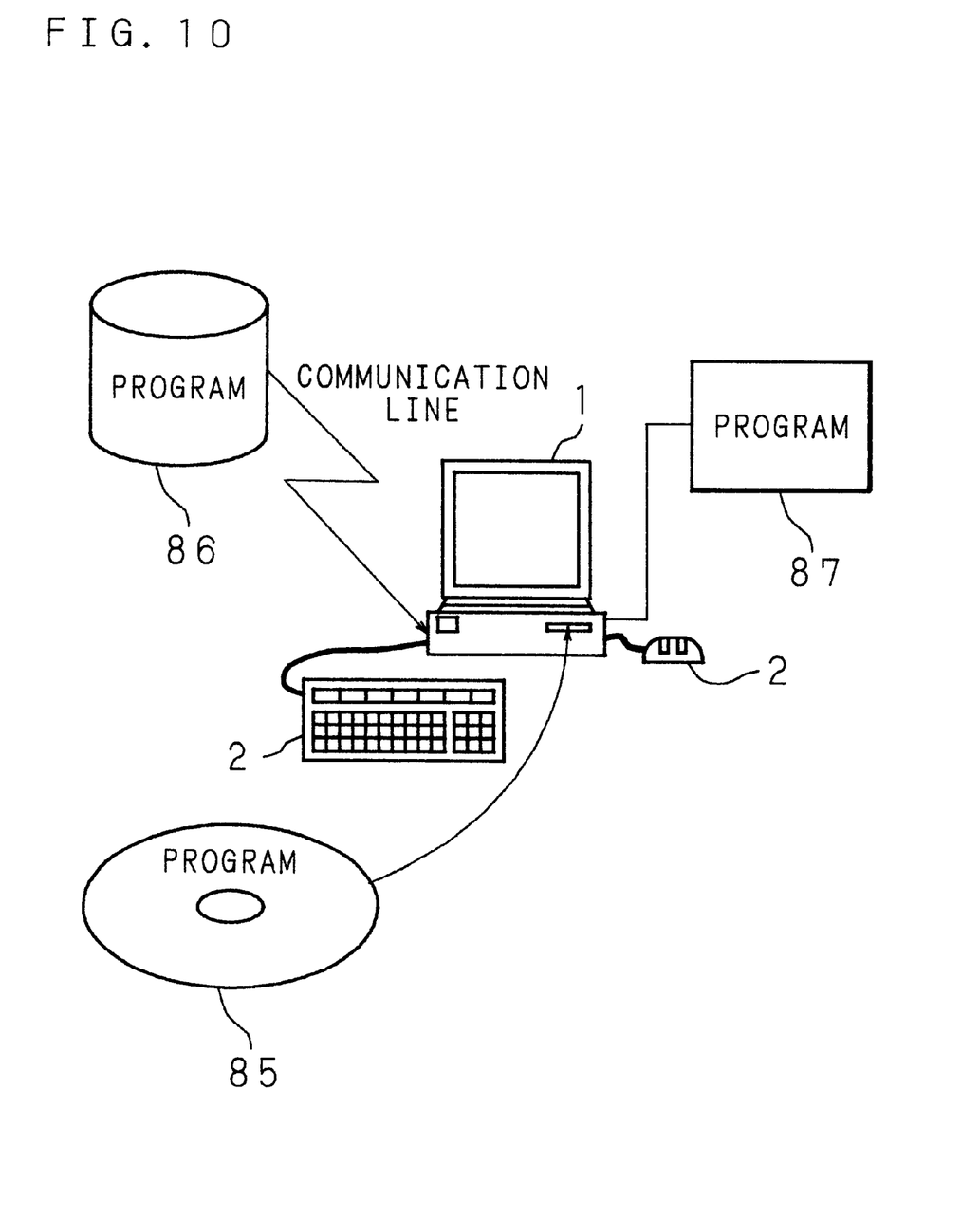
FIG. 10 is a schematic diagram showing a hardware constitution for realizing the invention.

The computer program for such image processing may be presented, as shown in FIG. 10, either by pre-installing in a computer RAM, or memory 87 such as a hard disk, or by storing in a portable recording medium 85 such as a CD-ROM, MO, or the like. Moreover, it may be also presented on-line from a circuit destination memory 86 which can send program to the computer by wireless or wire, for example, provided in the center.

In the illustrated embodiment, the cursor shape is square, but the shape of the cursor is not specified, and may include a circle or any other arbitrary shapes.

In the embodiment, it is shown to draw repeatedly the partial image corresponding to the cursor shape, but the repeatedly drawing part may be designated arbitrarily.

Also in the embodiment, the retouching range is designated by moving the cursor by dragging of the mouse, but the method of designating the retouching range may also include a method of designating the start point and end point, or designating the start point, transition point, and end point.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A recording medium readable by a computer and storing instructions to control the computer to perform a method comprising:

accepting designation of pixels in an image portion and a retouching range;

obtaining color and/or color intensity level of each pixel forming the image portion;

storing the color and/or color intensity level of each pixel in the image portion;

reading from storage the color and/or color intensity level of a pixel selected at random from a pixel group in the image portion as retouching data; and replacing the color and/or color intensity level of the pixels in the retouching range with the retouching data.

2. An image processing apparatus for retouching an image displayed on a screen, said apparatus comprising:

designation means for designating pixels in an image portion and a retouching range;

positioning means for securing a position of the image portion and the retouching range;

obtaining means for obtaining color and/or color intensity level of each pixel forming the image portion;

detecting means for detecting a retouching direction in the retouching range;

memory means for storing the color and/or color intensity level of each pixel in the image portion by a specific number of rows along the retouching direction;

retouching data generating means for reading the color and/or color intensity level stored in said memory means for each pixel of a row in the image portion corresponding to a row in the retouching direction in the retouching range as retouching data; and retouching means for replacing the color and/or color intensity level of the pixels in the retouching range with the retouching data.

3. An image processing apparatus for retouching an image displayed on a screen, said apparatus comprising:

designation means for designating pixels in an image portion and a retouching range;

positioning means for securing a position of the image portion and the retouching range;

obtaining means for obtaining color and/or color intensity level of each pixel forming the image portion;

detecting means for detecting a repetition pattern in the image portion repeated in a retouching direction;

memory means for storing the color and/or color intensity level of each pixel of the repetition pattern;

retouching data generating means for reading the color and/or color intensity level stored in said memory means for each pixel of the repetition pattern as retouching data; and retouching means for replacing the color and/or color intensity level of the pixels in the retouching range with the retouching data so as to reproduce the repetition pattern detected in the retouching range.

4. An image processing apparatus for retouching an image displayed on a screen, said apparatus comprising:

designation means for designating pixels in an image portion and a retouching range;

positioning means for securing a position of the image portion and the retouching range;

obtaining means for obtaining color and/or color intensity level of each pixel forming the image portion;

detecting means for detecting a gradation of the image portion changing in a retouching direction;

memory means for storing the color and/or color intensity level of each pixel in the gradation;

retouching data generating means for reading the color and/or color intensity level stored in said memory means for each pixel of the gradation as retouching data; and retouching means for replacing the color and/or color intensity level of the pixels in the retouching range with the retouching data so as to reproduce the gradation detected in the designated range.

5. An image processing apparatus for retouching an image displayed on a screen, the apparatus comprising:

designation means for designating an image portion and a retouching range;

positioning means for securing a position of the image portion and the retouching range;

obtaining means for obtaining color and/or color intensity level of each pixel forming the image portion;

memory means for storing the color and/or color intensity level of each pixel in the image portion;

retouching data generating means for generating retouching data by reading the color and/or color intensity level from said memory means for a pixel selected at random from a pixel group in the image portion; and retouching means for replacing the color and/or color intensity level of the pixels in the retouching range with the retouching data.

6. An image processing apparatus of claim 2, further comprising means for detecting a repetition pattern in the image portion repeated in the retouching direction, wherein the retouching data generating means includes means for generating the retouching data so as to reproduce the detected repetition pattern in the designated range.

7. An image processing apparatus of claim 2, further comprising means for detecting gradation of the image portion changing in the retouching direction, wherein the retouching data generating means includes means for generating the retouching data so as to reproduce the detected gradation in the designated range.

8. An image processing apparatus of claim 2, wherein the retouching data generating means generates the retouching data using the color and/or color intensity level of a pixel selected at random from a pixel group as an object of generation of the retouching data.

9. An image processing apparatus of claim 3, further comprising means for detecting gradation of the image portion changing in the retouching direction, wherein the retouching data generating means includes means for generating the retouching data so as to reproduce the detected gradation in the designated range.

10. An image processing apparatus of claim 3, wherein the retouching data generating means generates the retouching data using the color and/or color intensity level of a pixel selected at random from a pixel group as an object of generation of the retouching data.

11. An image processing apparatus of claim 4, wherein the retouching data generating means generates the retouching data using the color and/or color intensity level of a pixel selected at random from a pixel group as an object of generation of the retouching data.

12. A recording medium readable by a computer and storing instructions to control the computer to perform a method comprising:

accepting designation of pixels in an image portion and a retouching range;

obtaining color and/or color intensity level of each pixel forming the image portion;

detecting a retouching direction in the retouching range;

storing the color and/or color intensity level of each pixel in the image portion by a specified number of rows along the retouching direction;

reading the color and/or color intensity level of each pixel of a row in the image portion corresponding to a row in the retouching direction in the retouching range as retouching data; and replacing the color and/or color intensity level of the pixels in the retouching range with the retouching data.

13. A recording medium readable by a computer and storing instructions to control the computer to perform a method comprising:

accepting designation of pixels in an image portion and a retouching range;

obtaining color and/or color intensity level of each pixel forming the image portion;

detecting a repetition pattern in the image portion repeated in a retouching direction;

storing the color and/or color intensity level of each pixel in the repetition pattern;

reading the color and/or color intensity level from storage for each pixel of the repetition pattern as retouching data; and replacing the color and/or color intensity level of the pixels in the retouching range with the retouching data so as to reproduce the repetition pattern in the retouching range.

14. A recording medium readable by a computer and storing instructions to control the computer to perform a method comprising:

accepting designation of pixels in an image portion and a retouching range;

obtaining color and/or color intensity level of each pixel forming the image portion;

detecting a gradation in the image portion changing in a retouching direction;

storing the color and/or color intensity level of each pixel in the gradation;

reading the color and/or color intensity level from storage for each pixel of the gradation as retouching data; and replacing the color and/or color intensity level of the pixels in the retouching range with the retouching data so as to reproduce the detected gradation in the retouching range.

15. A recording medium of claim 14, wherein said reading to obtain the retouching data includes reading the color and/or color intensity level of a pixel selected at random from a pixel group in the image portion.

16. A recording medium of claim 13, wherein said reading to obtain the retouching data includes reading the color and/or color intensity level of a pixel selected at random from a pixel group in the image portion.

17. A recording medium of claim 12, wherein said method further comprises detecting a repetition pattern in the image portion repeated in the retouching direction, and wherein said reading of the retouching data and said replacing of the pixels in the retouching range with the retouching data reproduces the detected repetition pattern in the retouching range.

18. A recording medium of claim 12, wherein said method further comprises detecting gradation of the image portion changing in the retouching direction, and wherein said reading of the retouching data and said replacing of the pixels in the retouching range with the retouching data reproduces the detected gradation in the retouching range.

19. A recording medium of claim 12, wherein said reading to obtain the retouching data includes reading the color and/or color intensity level of a pixel selected at random from a pixel group in the image portion.

20. A recording medium of claim 13, wherein said method further comprises detecting gradation of the image portion changing in the retouching direction, and wherein said reading of the retouching data and said replacing of the pixels in the retouching range with the retouching data reproduces the detected gradation in the retouching range.

* * * * *